United States Patent
Pons (10) Patent No.: US 10,232,945 B2
(45) Date of Patent: Mar. 19, 2019

(54) SEAT PARTICULARLY FOR A PASSENGER TRANSPORT VEHICLE

(71) Applicant: ZODIAC ACTUATION SYSTEMS, Auxerre (FR)

(72) Inventor: Sylvain Pons, Paris (FR)

(73) Assignee: ZODIAC ACTUATION SYSTEMS, Auxerre (FR)

( * ) Notice: Subject to any disclaimer, the term of this patent is extended or adjusted under 35 U.S.C. 154(b) by 0 days.

(21) Appl. No.: 15/945,206

(22) Filed: Apr. 4, 2018

(65) Prior Publication Data

US 2018/0281965 A1  Oct. 4, 2018

(30) Foreign Application Priority Data

Apr. 4, 2017 (FR) .................................. 17 52921

(51) Int. Cl.
*B60N 2/806* (2018.01)
*B64D 11/06* (2006.01)
(Continued)

(52) U.S. Cl.
CPC .......... *B64D 11/0624* (2014.12); *B60N 2/879* (2018.02); *B60N 2/914* (2018.02);
(Continued)

(58) Field of Classification Search
CPC .... B60N 2/914; B60N 2/879; B64D 11/0624; B64D 11/0646; B64D 11/064;
(Continued)

(56) References Cited

U.S. PATENT DOCUMENTS 4,440,443 A    4/1984  Nordskog
5,133,017 A *  7/1992  Cain .................. G01R 33/3854
                                                         381/71.6
(Continued)

FOREIGN PATENT DOCUMENTS

DE    10 2004 058 788 A1    6/2006
EP        2 119 627 A1     11/2009
WO       2014-042243        3/2014

OTHER PUBLICATIONS

Elliott et al. 1988, Active cancellation of sound pressure at a point in a pure tone diffuse sound field is discussed, whereas (Elliott and Garcia-Bonito 1995) reports on active cancellation of pressure and pressure gradient in a diffuse sound field. Active control of stationary random sound field is analyzed in (Nelson et al. 1990).
(Continued)

*Primary Examiner* — Rodney B White
(74) *Attorney, Agent, or Firm* — Young & Thompson (57) ABSTRACT

Disclosed is a seat intended in particular for a passenger transport vehicle, the seat including a seating part, a backrest that pivots relative to the seating part, a headrest, and an active noise control device including: at least one error sensor capable of sensing a minimization acoustic field and generating a reference signal; a reference sensor able to capture an undesirable acoustic field; a processing unit able to generate a cancellation signal from the reference signal and from a signal representative of the undesirable acoustic field; and at least one speaker able to emit a cancellation acoustic field from the cancellation signal. The headrest includes a support and a first deformable casing carried by the support. The at least one error sensor is arranged on the first deformable casing.

8 Claims, 4 Drawing Sheets

(51) Int. Cl.
*B60N 2/90* (2018.01)
*B60N 2/879* (2018.01)
*G10K 11/175* (2006.01)

(52) U.S. Cl.
CPC ........ *B64D 11/064* (2014.12); *B64D 11/0646* (2014.12); *G10K 11/175* (2013.01); *G10K 2210/1281* (2013.01); *G10K 2210/3221* (2013.01)

(58) Field of Classification Search
CPC ......... G10K 11/175; G10K 2210/3221; G10K 2210/1281
USPC .................................................... 297/452.41
See application file for complete search history.

(56) References Cited

U.S. PATENT DOCUMENTS

| | | | | |
|---|---|---|---|---|
| 5,662,384 | A * | 9/1997 | O'Neill | A47C 4/54 297/452.41 X |
| 6,988,057 | B2 * | 1/2006 | Huang | G10K 11/172 181/249 |
| 8,616,654 | B2 * | 12/2013 | Zenk | B60N 2/914 297/452.41 |
| 9,090,332 | B2 | 7/2015 | Asao et al. | |
| 2002/0076059 | A1 * | 6/2002 | Joynes | G10K 11/178 381/71.6 |
| 2003/0038517 | A1 * | 2/2003 | Moran | B60N 2/914 297/452.41 X |
| 2003/0149360 | A1 * | 8/2003 | Tardy | A61N 7/022 600/437 |
| 2004/0045767 | A1 * | 3/2004 | Byrne | F02C 7/045 181/241 |
| 2006/0208549 | A1 * | 9/2006 | Hancock | B60N 2/0232 297/342 |
| 2007/0246979 | A1 | 10/2007 | Browne et al. | |
| 2009/0179469 | A1 | 7/2009 | Bass | |
| 2009/0315694 | A1 * | 12/2009 | Sinnett | B60C 23/0411 340/438 |
| 2010/0028134 | A1 * | 2/2010 | Slapak | F24F 13/24 415/119 |
| 2013/0163774 | A1 | 6/2013 | Maeda | |
| 2014/0112490 | A1 * | 4/2014 | Caillet | B60N 2/879 381/71.4 |
| 2015/0251573 | A1 * | 9/2015 | Misch | B60N 2/665 297/452.41 |

OTHER PUBLICATIONS

Preliminary French Search Report, dated Dec. 21, 2017, from corresponding FR application No. 17 52921.
GB Search Report for Application No. GB1805454.4, dated Oct. 1, 2018.

* cited by examiner

SEAT PARTICULARLY FOR A PASSENGER TRANSPORT VEHICLE

The present invention lies in the field of seats for transport vehicles and in particular in the field of seats for aircraft.

It is known to equip aircraft seats with active noise control devices. However, these active noise control devices are not always very effective. They are difficult to adjust because sound is perceived differently by passengers having different body types, by the same passenger in two different positions, or depending on whether the seat is in the sitting or reclined position.

The present invention aims to provide a seat equipped with an active noise control device that adapts to different passenger body types, to the various positions that a passenger can assume, and to the different seat positions.

For this purpose, the invention proposes a seat intended in particular for a passenger transport vehicle, said seat comprising:
 a seating part,
 a backrest that pivots relative to the seating part,
 a headrest comprising a support and a first deformable casing carried by the support,
 a pump able to circulate a filling fluid into or out of the first deformable casing in order to expand or contract the first deformable casing, and
 a control unit capable of controlling the deformation of the first deformable casing between the contracted form and the expanded form, the first deformable casing comprising a pressure sensor capable of measuring the pressure of the filling fluid inside the first deformable casing,
 an active noise control device comprising:
 at least one error sensor capable of sensing a minimization acoustic field and generating a reference signal, said at least one error sensor being arranged on said first deformable casing,
 a reference sensor able to capture an undesirable acoustic field,
 a processing unit able to generate a cancellation signal from the reference signal and from a signal representative of the undesirable acoustic field, and the processing unit comprising a memory storing at least two secondary transfer functions, each secondary transfer function being characteristic of the acoustic changes induced by at least a pair comprising an error sensor and a speaker, and a computing unit capable of selecting a secondary transfer function from the memory based on the pressure measured by the pressure sensor, said cancellation signal being generated from said selected secondary transfer function, and
 at least one speaker able to emit a cancellation acoustic field from the cancellation signal, According to some embodiments, the seat comprises one or more of the following features:
 wherein the control unit comprises a user interface able to be controlled by the passenger;
 wherein the first deformable casing further comprises a filler material; said filler material being a material among a fibrous material, a granular material, a viscous material, a liquid material and a foam, polystyrene beads;
 the seat further comprises comfort bladders arranged on said seat and wherein said pump is also adapted to circulate the filling fluid into or out of said comfort bladders;

According to a second embodiment of the invention, the seat comprises a seating part, a backrest that pivots relative to the seating part, a headrest comprising a support and a first deformable casing carried by the support, and an active noise control device comprising:
 at least one error sensor adapted to capture a minimization acoustic field and to generate a reference signal, said at least one error sensor being arranged on said first deformable casing,
 a reference sensor able to capture an undesirable acoustic field,
 a processing unit able to generate a cancellation signal from the reference signal and from a signal representative of the undesirable acoustic field, and
 at least one speaker able to emit an acoustic cancellation field from the cancellation signal, said at least one error sensor being arranged on said first deformable casing, characterized in that the first deformable casing comprises:
 a piezoelectric material, at least one voltage source, and electrical wires connecting the piezoelectric element to said at least one voltage source, and
 a control unit capable of controlling the deformation of the piezoelectric element, the control unit comprising a user interface able to be controlled by the passenger;

According to a third embodiment of the invention, the seat comprises a seating part, a backrest that pivots relative to the seating part, a headrest comprising a support and a first deformable casing carried by the support, and an active noise control device comprising:
 at least one error sensor adapted to capture a minimization acoustic field and to generate a reference signal, said at least one error sensor being arranged on said first deformable casing,
 a reference sensor able to capture an undesirable acoustic field,
 a processing unit able to generate a cancellation signal from the reference signal and from a signal representative of the undesirable acoustic field, and
 at least one speaker able to emit an acoustic cancellation field from the cancellation signal, said at least one error sensor being arranged on said first deformable casing, characterized in that the seat comprises an additional deformable casing, said additional deformable casing being movable relative to the first deformable casing, said additional deformable casing comprising an additional error sensor capable of transmitting an additional reference signal to the processing unit;

Advantageously, the additional deformable casing comprises a connector connected to said at least one additional error sensor able to generate an additional reference signal, and wherein the first deformable casing comprises a complementary connector connected to the processing unit, the connector being adapted for connection to the complementary connector in order to transmit the additional reference signal to the processing unit, the processing unit being adapted to generate the cancellation signal from the additional reference signal.

According to a third embodiment of the invention, the seat comprises a seating part, a backrest that pivots relative to the seating part, a headrest comprising a support and a first deformable casing carried by the support, and an active noise control device comprising:
 at least one error sensor adapted to capture a minimization acoustic field and to generate a reference signal, said at least one error sensor being arranged on said first deformable casing, a reference sensor able to capture an undesirable acoustic field, a processing unit able to generate a cancellation signal from the reference signal and from a signal representative of the undesirable acoustic field, and at least one speaker able to emit an acoustic cancellation field from the cancellation signal, said at least one error sensor being arranged on said first deformable casing, characterized in that the at least one speaker is also able to output audio content originating from a communication device, and in that the processing unit is adapted to calibrate at least one secondary transfer function according to the audio content that is output, the minimization acoustic field, and the undesirable acoustic field, said calibration being periodically implemented at a predefined frequency, said cancellation signal being generated from said calibrated secondary transfer function.

According to a fourth embodiment of the invention, the seat comprises a seating part, a backrest that pivots relative to the seating part, a headrest comprising a support and a first deformable casing carried by the support, and an active noise control device comprising:

at least one error sensor adapted to capture a minimization acoustic field and to generate a reference signal, said at least one error sensor being arranged on said first deformable casing a reference sensor able to capture an undesirable acoustic field, a processing unit able to generate a cancellation signal from the reference signal and from a signal representative of the undesirable acoustic field, and at least one speaker able to emit an acoustic cancellation field from the cancellation signal, said at least one error sensor being arranged on said first deformable casing, characterized in that the seat which comprises a backrest actuator adapted to rotate the backrest relative to the seating part and wherein the control unit comprises a mapping, associating with each backrest position relative to the seating part a quantity of filling fluid contained in the first deformable casing, such that the control unit is able to control the deformation of the first deformable casing according to the position of the backrest relative to the seating part;

Advantageously, the seat comprises at least two error sensors arranged on the first deformable casing and wherein the processing unit comprises:

a memory storing at least two secondary transfer functions, each secondary transfer function being characteristic of acoustic changes induced by at least a pair comprising an error sensor and a speaker, and a computing unit adapted to select a secondary transfer function from memory based on the relative position of the backrest to the seating part, the cancellation signal being generated from said selected secondary transfer function.

The invention will be better understood by reading the description which follows, given solely by way of example and with reference to the figures in which.

The present invention relates to a seat 2 intended in particular for a passenger transport vehicle.

Figure 1:
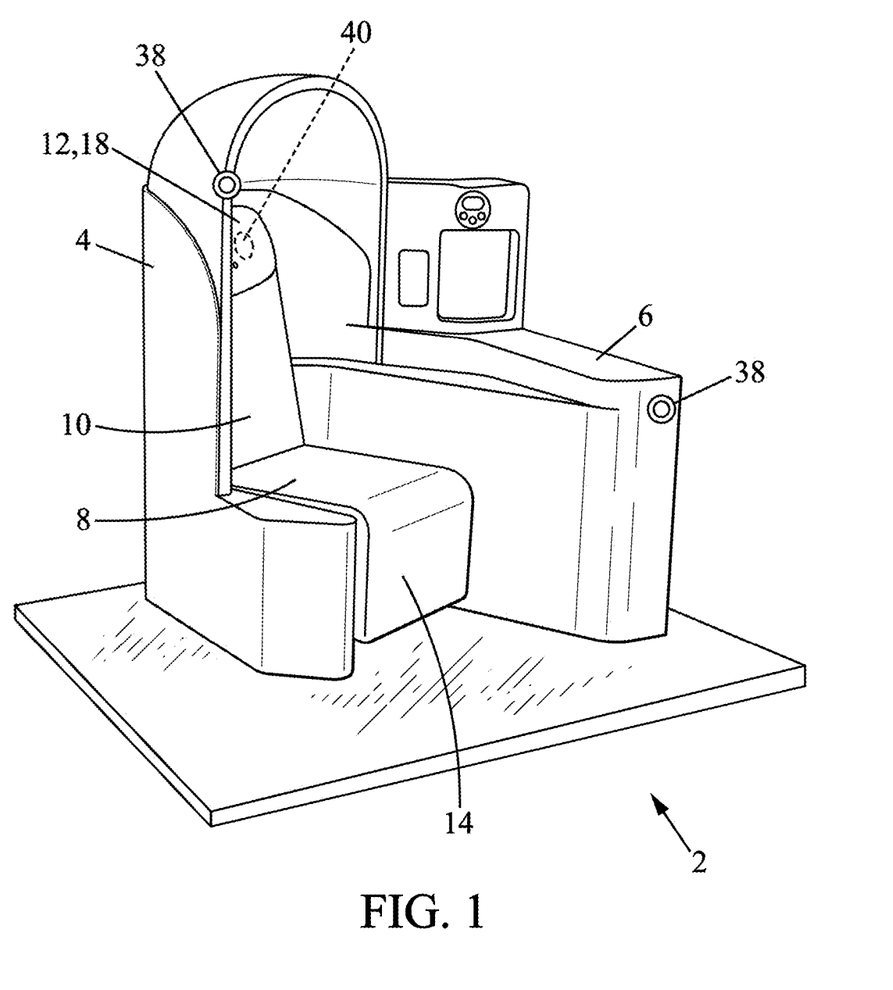
FIG. 1 is a schematic relief view of a seat according to a first embodiment of the invention.

This seat may for example be mounted in a seat module as represented in FIG. 1. This type of seat module is generally installed in a first class or business class zone of a passenger aircraft. This seat module comprises a housing 4 which surrounds the rear and sides of the seat 2 and which is extended on one side by a work table 6 on which the passenger can place objects.

Figure 2:
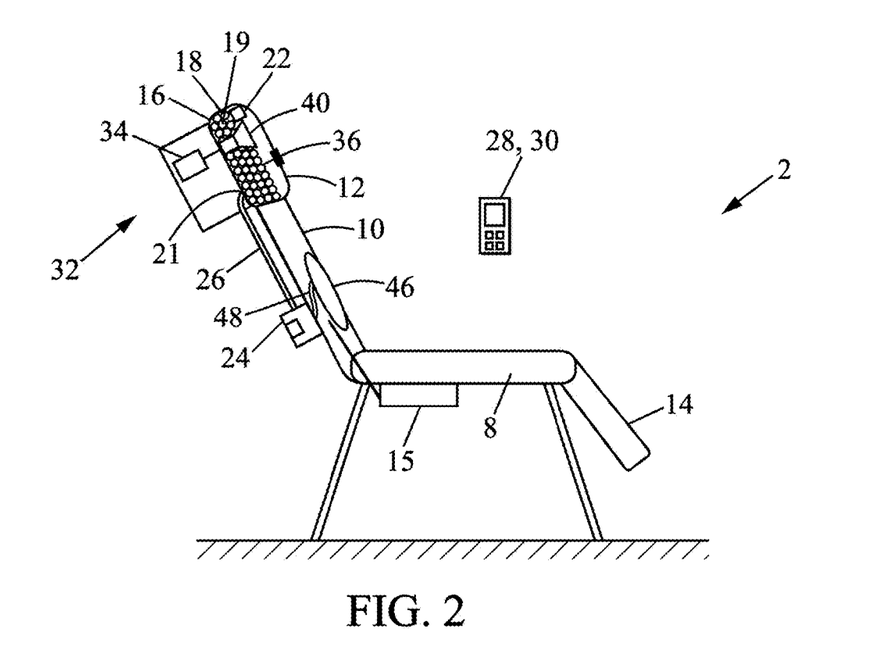
FIG. 2 is a schematic section view of a portion of the seat shown in FIG. 1.

Referring to FIG. 2, the seat 2 comprises a seating part 8, a backrest 10 mounted so as to pivot relative to the seating part 8, a headrest 12 fixed to the backrest, a footrest 14 fixed to the seating part, and a backrest actuator 15 adapted to control the pivoting of the backrest 10 relative to the seating part 8.

Preferably, the headrest 12 and the footrest 14 are also respectively pivotable relative to the backrest 10 and to the seating part 8.

Referring to FIG. 2, the headrest 12 comprises a support 16 and a deformable casing 18 carried by the support, referred to as the first deformable casing.

The support consists for example of a frame.

The deformable casing 18 is adapted to be expanded or contracted according to the needs of the passenger. The deformable casing 18 is fluidtight. It is for example made of plastic or elastomer.

According to the first embodiment of the invention, the deformable casing 18 contains a filling material 19, a filling fluid 20, a hole 21 for the passage of filling fluid, and a pressure sensor 22.

The filling material 19 consists for example of polystyrene beads, a fibrous material, a granular material, a viscous material, a liquid material, or a foam.

The seat 2 further comprises a pump 24 adapted to circulate a filling fluid into or out of the deformable casing 18 in order to expand or contract the deformable casing, a hollow flexible tube 26 connecting the outlet of the pump 24 to the hole 21 of the deformable casing, and a control unit 28 to control turning the pump on or off.

The pump 24 is for example fixed to the back of the backrest 10 or under the seating part 8.

In the embodiment illustrated in FIG. 1, the filling fluid 20 consists of the pressurized air contained in the cabin of the aircraft. According to a variant not shown, the filling fluid 20 may be a gas or a liquid contained in a reserve connected to the pump.

The control unit 28 is also able to control the backrest actuator 15 so as to control the pivoting of the backrest 10 relative to the seating part 8.

In the illustrated embodiment, the control unit 28 comprises a user interface 30 that can be controlled by the passenger to adjust the inflation of the deformable casing 18 according to his or her body type, sensitivity, or reclined or sitting position. This user interface 30 is for example a remote control or a tablet.

Alternatively, the control unit 28 may also be controlled by a central computer managed by the cabin crew.

Advantageously, the passenger can adjust the inflation of the casing of the headrest according to his or her body type, perceived comfort, or reclined or seated position.

The seat 2 further comprises a "Feed Forward Control" type of active noise control device 32. The general operating principle of this type of active noise control device is known per se and will not be described in detail. Its operating principle is for example described in the book "Adaptive Feed Foward Control of Low Frequency Interior Noise" by Thomas Kletschkowski, published in 2012 by Springer (see chapter 6.2 for example).

Figure 3:
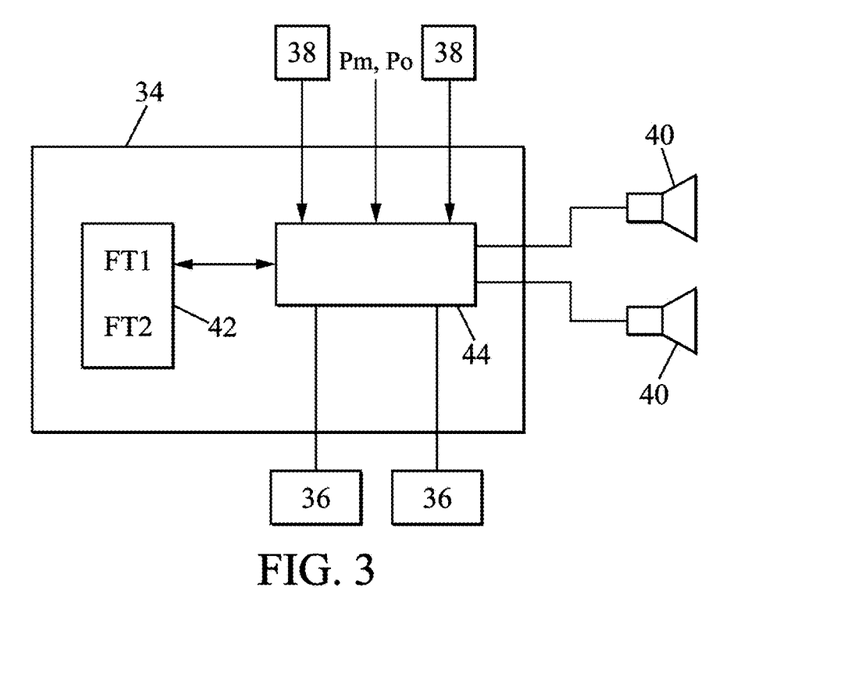
FIG. 3 is a schematic view of the active noise control device according to the first embodiment of the invention.

With reference to FIGS. 1 to 3, the active noise control device 32 comprises a processing unit 34, error sensors 36 connected to the processing unit, reference sensors 38 connected to the processing unit, and speakers 40 connected to the processing unit. In FIG. 3, two error sensors 36, two reference sensors 38, and two speakers 40 are represented by way of example.

Figure 4:
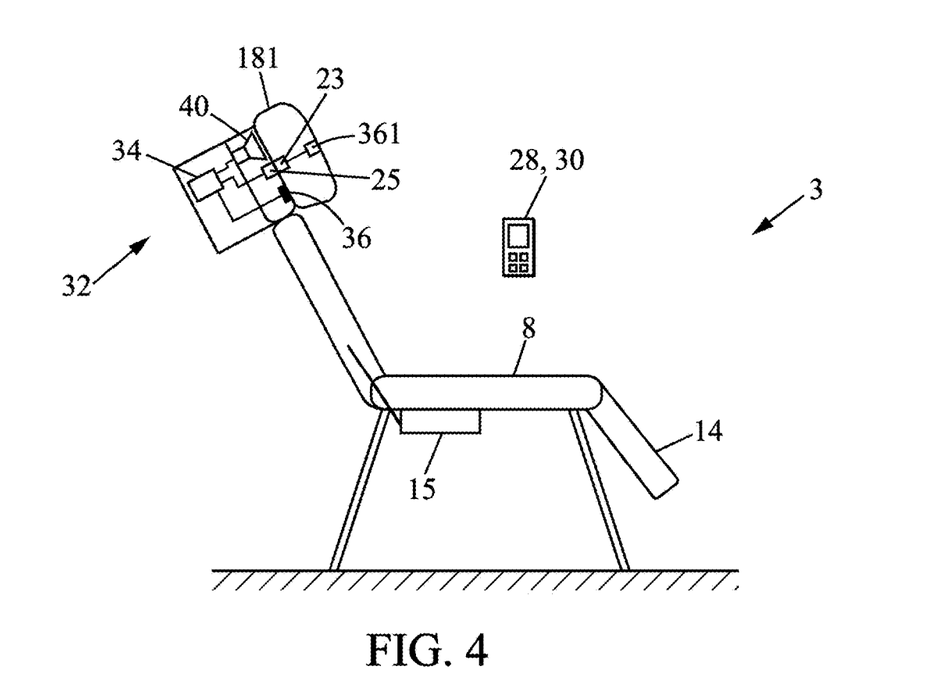
FIG. 4 is a section view of a portion of a seat according to a second embodiment of the invention.

The processing unit 34 is able to generate a cancellation signal from the acoustic fields Cm captured by the reference sensors 38 and from the acoustic fields Ci captured by the error sensors 36. With reference to FIG. 4, the processing unit 34 comprises a memory 42 and a computing unit 44 connected to the memory 42.

The memory 42 stores transfer functions in particular, generally called secondary transfer functions FT1, FT2. Each secondary transfer function FT1, FT2 has been predefined according to the characteristics and the positioning of each paired error sensor 36—speaker 40. For example, in the case where the seat 2 comprises two speakers 40 and two error sensors 36, the memory stores four secondary transfer functions.

The computing unit 44 is connected to the reference sensors 38, as well as to the pressure sensors 22 and to the speakers 40. It is able to receive reference signals captured by the reference sensors 38 as well as information relating to the measured pressure Pm in the deformable casing 18.

The computing unit 44 is able to select the secondary transfer functions FT1, FT2 to be applied to the reference signals captured by the reference sensors 38. The computing unit 44 is also able to generate a signal in phase opposition to the reference signal. This signal in phase opposition is called the cancellation signal.

The computing unit 44 is able to transmit this cancellation signal to the speakers 40.

The error sensors 36 are able to capture a minimization acoustic field Cm. According to the present invention, the error sensors 36 are fixed to the deformable casing 18.

The reference sensors 38 are able to capture an unwanted acoustic field Ci upstream of the passenger's ears. In particular, the reference sensors 38 are fixed upstream of the error sensors when considering the direction of propagation of the acoustic field of the disturbance. They may, for example, be mounted on the outer contours of the housing 4 or at the end of the work table 6 as illustrated in FIG. 1.

The reference sensors 38 are able to produce a reference signal. This reference signal is processed by the computing unit 44. In particular, the computing unit 44 is able to apply certain secondary transfer functions FT1, FT2 to the reference signal. The secondary transfer functions FT1, FT2 which will be applied are selected by the computing unit 44 according to the pressure Pm measured by the pressure sensor 22 arranged in the deformable casing 18.

The speakers 40 are able to emit an acoustic cancellation field based on the cancellation signal. They are arranged in the deformable casing 18, as shown in FIGS. 2 and 3. The speakers 40 are connected to the processing unit 34. The deformable casing 18 acts as a speaker enclosure for the speakers. For this purpose, it is fixed to the same structure as the speakers and comprises for example a geometry enabling what is referred to as "bass reflex" behavior.

Optionally, the seat 2 comprises comfort bladders 46 connected to the pump 24 by flexible hoses 48, as illustrated in the embodiment of FIG. 2. The comfort bladders 46 are, for example, lumbar comfort bladders 10 located at the backrest 10 in order to support the lumbar muscles of the passenger to provide relief or comfort bladders located on the seating part 8 on each side of the thighs of the passenger, or comfort bladders located at the neck or on each side of the headrest 12. Inflation of the comfort bladders 46 can be achieved by controlling the pump 24, for example by means of the user interface 30.

During operation, the passenger controls the pump 24 as desired. For example, the deformable casing 18 is inflated when the seat 2 is in the reclined position. Then, the sensor 22 measures the pressure inside the deformable casing 18 and the active noise control device 32 regulates the acoustic cancellation field emitted by the speakers 40 according to this pressure in order to minimize the minimization acoustic field.

Alternatively, the speakers are mounted in the inner face of the housing 4 at the height of the headrest.

According to a first variant of the operation of the active noise control device, the passenger does not control the deformation of the deformable casing. This deformation is performed automatically by the control unit 28 according to the position of the backrest 10 with respect to the seating part 8. In this variant, the control unit 28 comprises a mapping associating each position Po of the backrest relative to the seating part, with a quantity of pressurized air contained in the deformable casing 18. Thus, for example, in this variant, the passenger controls the backrest actuator 15 by using the control unit 28 to place the seat 2 in a reclined position. Then, the control unit 28 automatically controls the pump 24 to adjust the amount of pressurized air contained in the deformable casing. The control unit 28 is also able to adjust parameters such as the gain of the cancellation signals, the weighting factor of the filters of the secondary transfer functions, or the leakage factors of the filters of the secondary transfer functions, according to the position Po of the seat.

According to a second variant of the operation of the active noise control device, the deformable casing 18 does not comprise a pressure sensor 22. In this case, the control unit 28 is able to send to the computing unit 44 the position of the backrest Po relative to the seating part. The computing unit is able to select a secondary transfer function from memory 32 based on the position Po received from the control unit 28. This secondary transfer function is applied to the reference signal.

Figure 5:
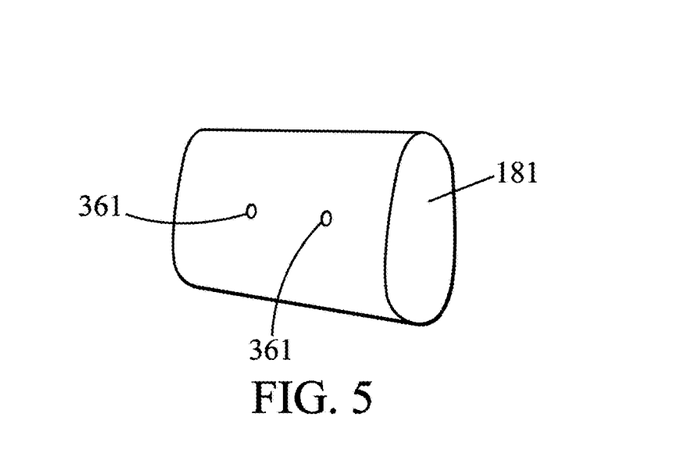
FIG. 5 is a perspective view of a deformable casing according to the second embodiment of the invention.

FIGS. 4 and 5 illustrate a seat 3 according to a second embodiment of the invention. The seat 3 according to this second embodiment is similar to the seat 2 according to the first embodiment except that it does not include a pump 24, pressure sensor 22, and flexible hose 26, and that the head support 12 further comprises an additional deformable casing 181 adapted to be arranged on the first deformable casing 18.

In this second embodiment, the control unit 28 no longer controls the deformation of the first deformable casing 18. The active noise control device 32 operates according to the first or second variant of the operation described above.

The first deformable casing 18 is similar to the first casing according to the first embodiment. In particular, it includes speakers 40 connected to the processing unit 34, and on its outer surface it carries error sensors 36 connected to the processing unit 34. It is completely filled with a filling material. This filling material has not been represented in FIG. 4 to simplify the figure.

The additional deformable casing 181 is movable relative to the first deformable casing 18. It may be arranged as a pillow on the first deformable casing. It may comprise a fastening strip such as a strip of "Velcro"™ intended to be fixed to a complementary strip fixed on the first deformable casing 18. The additional deformable casing 181 may also be stored in a cabinet.

The additional deformable casing 181 comprises, on a first external surface, two additional error sensors 361 able to generate additional reference signals. The additional error sensors 61 are able to transmit the captured additional reference signals to the processing unit 34.

According to an embodiment not shown, this transmission is performed by a wireless communication link.

According to the embodiment shown in FIG. 4, the additional deformable casing 181 comprises a connector 23 arranged on a face opposite to the face equipped with additional error sensors 361. The first deformable casing 18 comprises a complementary connector 25 flush with its external surface. The connector 23 is connected to the additional error sensors 361. The complementary connector 25 is connected to the processing unit 34. The complementary connector 25 is intended to be connected to the connector 23 in order to transmit the additional reference signals from the additional deformable casing 181 to the processing unit 34, after the additional deformable casing 181 has been installed on the first deformable casing.

The computing unit 44 is able to recognize that the connector 23 of the additional deformable casing 181 is connected to the complementary connector 25 by a discrete address system. The computing unit 44 is able to take into account the additional reference signals and all the associated parameters instead of the reference signals and parameters associated with the error sensors 36 included in the first deformable casing. The speakers 40 of the first deformable casing are adapted to output the acoustic cancellation field.

During operation, the processing unit 34 generates the cancellation signal from the reference signals of the error sensors 36 of the first deformable casing, when the additional deformable casing 181 is not arranged on the first deformable casing 18. This mode of operation is for example used in the sitting position. The processing unit 34 generates the cancellation signal from the additional reference signals, when the additional deformable casing 181 is arranged on the first deformable casing 18. This mode of operation is for example used in the reclined position.

According to a variant of this second embodiment, the speakers 40 are arranged in the inner face of the housing 4.

According to a variant not represented, the deformable casing 18 comprises a piezoelectric material, a voltage source, and electrical wires connecting the piezoelectric element to the voltage source. In this embodiment, the control unit 30 controls the voltage applied to the piezoelectric element so as to contract or expand the deformable casing 18. This control can be done directly by the passenger via the user interface 30 or indirectly by the passenger. In the latter case, the passenger controls the backrest actuator 15 to choose a position of the backrest 10 relative to the seating part 8. The control unit 30 applies a voltage between the two faces of the piezoelectric element according to a mapping contained in its memory. Such a mapping associates a voltage with each position of the backrest relative to the seating part.

Figure 6:
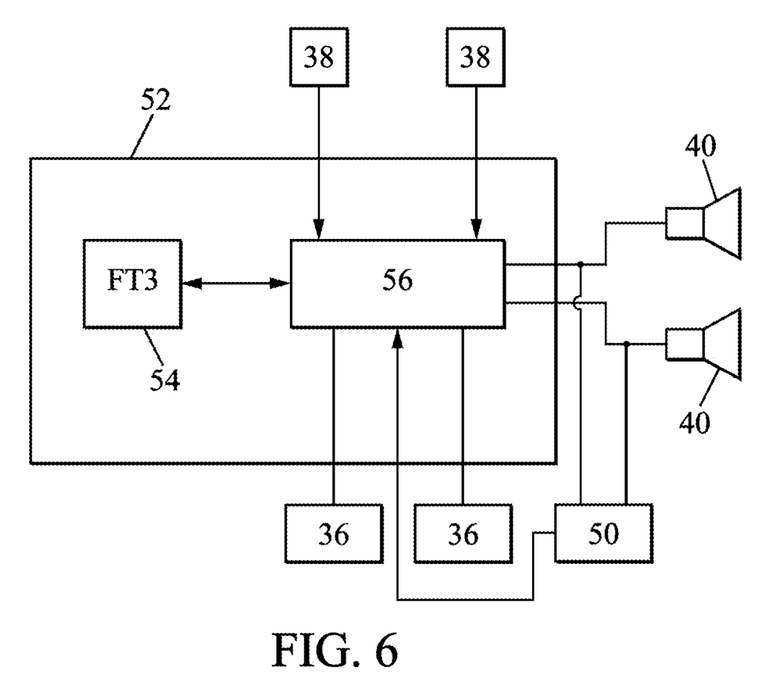
FIG. 6 is a schematic view of a variant of the active noise control device.

According to an alternative embodiment of the invention illustrated in FIG. 6, the speakers 40 are also connected to a communication device 50. This communication device 50 is able to output audio content via the speakers 40. Such a communication device 50 may for example be the audio channel of a video screen ("In Flight Entertainment") or a channel for playing music or announcing information relating to the flight.

In this embodiment illustrated in FIG. 6, the processing unit 52 comprises a memory 54 and a computing unit 56. The memory 54 contains a secondary transfer function FT3 to be calibrated. The computing unit 56 is able to calibrate this secondary transfer function FT3 based on the audio content being played, the reference signal, and the signal representative of the undesirable acoustic field Ci. This calibration is implemented periodically at a predefined frequency. Finally, the computing unit 56 is able to generate a cancellation signal from said calibrated secondary transfer function.

Alternatively, the parameters selected by the computing unit, for example such as transfer functions, are chosen according to information coming from a seat control system. This information is for example the position of the seat, the weight of the passenger, etc.

Alternatively, the deformable casing is mechanical only.

The invention claimed is:

1. A seat (2, 3) for a passenger transport vehicle, said seat (2, 3) comprising:—a seating part (8),—a backrest (10) that pivots relative to the seating part (8),—a headrest (12) comprising a support (16) and a first deformable casing (18) carried by the support,—a pump (24) able to circulate a filling fluid (20) into or out of the first deformable casing (18) in order to expand or contract the first deformable casing (18), and—a control unit (28) capable of controlling the deformation of the first deformable casing (18) between the contracted form and the expanded form, the first deformable casing (18) comprising a pressure sensor (22) capable of measuring the pressure of the filling fluid inside the first deformable casing (18),—an active noise control device (32) comprising:—at least one error sensor (36) capable of sensing a minimization acoustic field (Cm) and generating a reference signal, said at least one error sensor (36) being arranged on said first deformable casing (18),—a reference sensor (38) able to capture an undesirable acoustic field (Ci),—a processing unit (34) able to generate a cancellation signal from the reference signal and from a signal representative of the undesirable acoustic field (Ci), and the processing unit (34) comprising a memory (42) storing at least two secondary transfer functions (FT1, FT2), each secondary transfer function (FT1, FT2) being characteristic of the acoustic changes induced by at least a pair comprising an error sensor (36) and a speaker (40), and a computing unit (44) capable of selecting a secondary transfer function (FT1, FT2) from the memory (42) based on the pressure measured by the pressure sensor (22), said cancellation signal being generated from said selected secondary transfer function, and—at least one speaker (40) able to emit an acoustic cancellation field from the cancellation signal.

2. The seat (2) according to claim 1, wherein the control unit (28) comprises a user interface (30) able to be controlled by the passenger.

3. The seat (2) according to claim 2, wherein the first deformable casing (18) further comprises a filler material (19); said filler material (19) being a material among a fibrous material, a granular material, a viscous material, a liquid material and a foam, polystyrene beads.

4. The seat (2) according to claim 3 which further comprises comfort bladders (46) arranged on said seat (2), and wherein said pump (24) is also adapted to circulate the filling fluid into or out of said comfort bladders (46).

5. The seat (2) according to claim 2 which further comprises comfort bladders (46) arranged on said seat (2), and wherein said pump (24) is also adapted to circulate the filling fluid into or out of said comfort bladders (46).

6. The seat (2) according to claim 1, wherein the first deformable casing (18) further comprises a filler material (19); said filler material (19) being a material among a fibrous material, a granular material, a viscous material, a liquid material and a foam, polystyrene beads.

7. The seat (2) according to claim 6 which further comprises comfort bladders (46) arranged on said seat (2), and wherein said pump (24) is also adapted to circulate the filling fluid into or out of said comfort bladders (46).

8. The seat (2) according to claim 1 which further comprises comfort bladders (46) arranged on said seat (2), and wherein said pump (24) is also adapted to circulate the filling fluid into or out of said comfort bladders (46).

\* \* \* \* \*